(12) United States Patent
Mandal et al.

(10) Patent No.: US 11,080,365 B2
(45) Date of Patent: Aug. 3, 2021

(54) SOLVING LATTICE PROBLEMS USING ANNEALING

(71) Applicant: FUJITSU LIMITED, Kawasaki (JP)

(72) Inventors: Avradip Mandal, Sunnyvale, CA (US); Arnab Roy, Santa Clara, CA (US); Hart Montgomery, Redwood City, CA (US)

(73) Assignee: FUJITSU LIMITED, Kawasaki (JP)

( * ) Notice: Subject to any disclaimer, the term of this patent is extended or adjusted under 35 U.S.C. 154(b) by 295 days.

(21) Appl. No.: 16/177,375

(22) Filed: Oct. 31, 2018

(65) Prior Publication Data

US 2020/0133995 A1 Apr. 30, 2020

(51) Int. Cl.
*G06F 17/16* (2006.01)
*H04L 9/30* (2006.01)
*G06N 20/10* (2019.01)

(52) U.S. Cl.
CPC ............. *G06F 17/16* (2013.01); *G06N 20/10* (2019.01); *H04L 9/3093* (2013.01)

(58) Field of Classification Search
CPC ....... G06F 17/16; G06N 20/10; H04L 9/3093; H04L 9/30
See application file for complete search history.

(56) References Cited

U.S. PATENT DOCUMENTS

| 10,097,351 B1* | 10/2018 | Kelly | H04L 9/0662 |
| 2011/0016325 A1* | 1/2011 | Futa | H04L 9/3247 |
| | | | 713/179 |
| 2015/0205759 A1* | 7/2015 | Israel | G06N 10/00 |
| | | | 703/2 |
| 2018/0075342 A1 | 3/2018 | Tamura et al. | |

(Continued)

OTHER PUBLICATIONS

Matsubara et al. "Ising-Model Optimizer with Parallel-Trial Bit-Sieve Engine", In L. Barolli and O. Terzo (eds.), Complex, Intelligent, and Software Intensive Systems, Advances in Intelligent Systems and Computing 611, Jul. 5, 2017.

(Continued)

*Primary Examiner* — Quazi Farooqui
(74) *Attorney, Agent, or Firm* — Maschoff Brennan

(57) ABSTRACT

According to an aspect of an embodiment, operations may include obtaining a basis "A" that defines a lattice in an m-dimensional space. The operations may further include obtaining a target vector "y" that defines a particular location in the m-dimensional space. In addition, the operations may include generating an Ising model connection weight matrix "W" by multiplying a transposition of "A" ("$A^T$") by "A". Moreover, the operations may include generating an Ising model bias vector "b" by multiplying a transposition of "y" ("$y^T$") by "A". The operations may further include providing "W" and "b" to an annealing system configured to solve problems written according to the Ising model. Additionally, the operations may include obtaining an output from the annealing system that represents an output vector "x" of a particular point included in the lattice that is the closest point in the lattice to the particular location defined by "y".

18 Claims, 4 Drawing Sheets

(56) References Cited

U.S. PATENT DOCUMENTS

2018/0107172 A1    4/2018   Takatsu
2020/0082738 A1*  3/2020   Poeppelmann ....... H04L 9/3093

OTHER PUBLICATIONS

Shor et al. "Polynomial-Time Algorithms for Prime Factorization and Discrete Logarithms on a Quantum Computer." SIAM Review, vol. 41, No. 2, 1999, pp. 303-332. JSTOR, JSTOR, www.jstor.org/stable/2653075.

Aharonov, Dorit, et al. "Adiabatic quantum computation is equivalent to standard quantum computation." SIAM review 50.4 (2008): 755-787.

Boixo, Sergio, et al. "Evidence for quantum annealing with more than one hundred qubits." Nature Physics 10.3 (2014): 218-224.

Glauber, Roy J. "Time-dependent statistics of the Ising model." Journal of mathematical physics 4.2 (1963): 294-307.

Cipra, Barry A. "The Ising model is NP-complete." SIAM News33.6 (2000): 1-3.

Lucas, Andrew. "Ising formulations of many NP problems." Frontiers in Physics 2 (2014): 5.

Sahraei, Saeid, and Michael Gastpar. "Polynomially solvable instances of the shortest and closest vector problems with applications to compute-and-forward." IEEE Transactions on Information Theory 63.12 (Nov. 26, 2017): 7780-7792.

Nazer, Bobak, and Michael Gastpar. "Compute-and-forward: Harnessing interference through structured codes." IEEE Transactions on Information Theory 57.10 (2011): 6463-6486.

Zhan, Jiening, et al. "Integer-forcing linear receivers." IEEE Transactions on Information Theory 60.12 (2014): 7661-7685.

Zhu, Jingge, and Michael Gastpar. "Asymmetric compute-and-forward with CSIT." arXiv preprint arXiv:1401.3189 (2014).

* cited by examiner

FIG. 3 is a flowchart of an example method of solving a closest vector lattice problem; and FIG. 4 is a flowchart of an example method of solving a shortest vector lattice problem.

SOLVING LATTICE PROBLEMS USING ANNEALING

FIELD

The embodiments discussed in the present disclosure are related to solving lattice problems using annealing.

BACKGROUND

Lattice problems such as a closest vector problem and a shortest vector problem are classes of optimization problems on lattices. Lattice problem solving may be applicable in various technical fields such as cryptography and communication relaying techniques.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, operations may include obtaining a basis "A" that defines a lattice in an m-dimensional space, the lattice including a plurality of points in the m-dimensional space, the basis "A" being a matrix of "n" number of linearly independent vectors in which each respective vector has "m" elements that define a location in the m-dimensional space and in which each respective point of the lattice is defined with respect to a linear combination of the vectors of the basis. The operations may further include obtaining a target vector "y" that defines a particular location in the m-dimensional space. In addition, the operations may include generating an Ising model connection weight matrix "W" by multiplying a transposition of "A" ("$A^T$") by "A". Moreover, the operations may include generating an Ising model bias vector "b" by multiplying a transposition of "y" ("$y^T$") by "A". The operations may further include providing "W" and "b" to an annealing system configured to solve problems written according to the Ising model. Additionally, the operations may include obtaining an output from the annealing system that represents an output vector "x" of a particular point included in the lattice in which the particular point is the closest point in the lattice to the particular location defined by "y". Moreover, the operations may include using "x" to obtain a solution to a closest vector problem that is defined by finding which point in the lattice is closest to the particular location as defined by "y".

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Lattice problems, such as a closest vector problem and a shortest vector problem, are a class of optimization problems that have a variety of applications such as with cryptography and wireless communication relaying techniques. In addition, quantum annealing systems use a heuristic approach to obtain solutions to optimization problems in a manner that is faster than classical computing systems and techniques. Moreover, digital annealing systems are classical computing systems that have been developed to simulate quantum annealing through large-scale parallelization. As such, quantum and digital annealing systems may be useful in helping to solve lattice problems, which may improve some technical fields such as cryptography and cryptanalysis and/or wireless communications.

However, the inputs typically used with lattice problems are not configured in a manner that allows for the use of an annealing system (e.g., a digital annealing system or a quantum annealing system) to solve lattice problems. For example, in some instances an annealing system may be configured to solve quadratic optimization problems using an Ising optimization model. However, the inputs typically used with lattice problems are not configured in a manner that allows the inputs to be directly input into an Ising optimization model. As such, annealing systems may not be able to be used to solve traditionally formed lattice problems.

According to one or more aspects of the present disclosure, one or more operations may be performed with respect to lattice problem input values to obtain Ising model inputs that may be input into an Ising optimization model of an annealing system. The annealing system may then use the Ising optimization model and the obtained Ising model inputs to generate an output vector that may be used to solve a corresponding lattice problem.

As such, according to one or more embodiments of the present disclosure, the operations described herein allow for an improvement in annealing systems by providing a mechanism that allows the annealing systems to solve lattice problems, which results in new capabilities of annealing systems. The improved capabilities of annealing systems being able to solve lattice problems also improves other technological fields such as cryptography and wireless communications by providing a new mechanism (e.g., annealing systems) that allows for the solving of lattice problems as used in those fields.

Embodiments of the present disclosure are explained with reference to the accompanying drawings.

Figure 1:
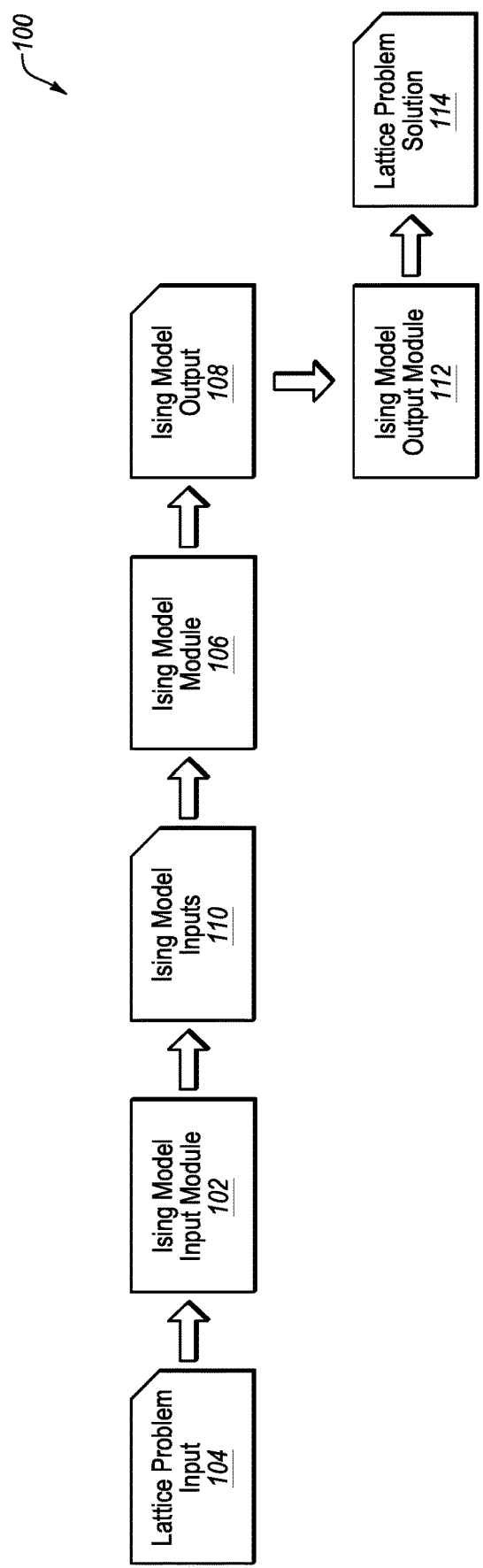
FIG. 1 is a diagram representing an example environment related to solving lattice problems.

FIG. 1 is a diagram representing an example environment 100 related to solving lattice problems using an annealing system, arranged in accordance with at least one embodiment described in the present disclosure. The environment 100 may include an Ising model input module 102 ("input module 102"), an Ising model Module 106 ("Ising module 106"), and an Ising model output module 112 ("output module 112").

The input module 102, the Ising module 106, and/or the output module 112 may include code and routines configured to enable a computing device to perform one or more of the operations described therewith. Additionally or alternatively, the input module 102, the Ising module 106, and/or the output module 112 may be implemented using hardware including any number of processors, microprocessors (e.g., to perform or control performance of one or more operations), field-programmable gate arrays (FPGAs), application-specific integrated circuits (ASICs) or any suitable combination of two or more thereof. In some other instances, the input module 102, the Ising module 106, and/or the output module 112 may be implemented using a combination of hardware and software. In the present disclosure, operations described as being performed by the input module 102, the Ising module 106, and/or the output module 112 may include operations that the input module 102, the Ising module 106, and/or the output module 112 may direct a corresponding system to perform.

In some embodiments, the input module 102, the Ising module 106, and the output module 112 may each be included in an annealing system (e.g., a digital annealing system or a quantum annealing system). Additionally or alternatively, the Ising module 106 may be included in the annealing system and one or more of the input module 102 and the output module 112 may be included in a separate system that is configured to interface with the annealing system. Further, the input module 102, the Ising module 106, and the output module 112 are illustrated and described as separate elements to facilitate explanation of the present disclosure. As such, any suitable hardware and/or software arrangement configured to perform the operations described as being performed by the input module 102, the Ising module 106, and the output module 112 is within the scope of the present disclosure.

A lattice is a commonly defined as a set of points in an m-dimensional space that are an integer linear combination of a set of m-dimensional vectors. Further, the locations of the points within the m-dimensional space are commonly defined according to the set of linearly independent vectors that each define a location in the m-dimensional space. The set of linearly independent vectors are commonly referred to as the basis of the lattice.

Each vector that makes up the basis may have "m" number of elements that may each give a coordinate that may allow for identification of the position of a respective point in the m-dimensional space. For example, for a 3-dimensional space defined according to a Cartesian coordinate system, a particular basis vector may include three elements in which one element may correspond to an x-coordinate, another element may correspond to a y-coordinate, and another element may correspond to a z-coordinate. The number of vectors in the basis may define an n-dimensional space of the lattice within the m-dimensional space. For example, a basis with two vectors that are part of a 3-dimensional space may define a 2-dimensional lattice within the 3-dimensional space. In some embodiments, the basis may accordingly be defined as a matrix of "n" linearly independent vectors in which each respective vector has "m" elements that define a location in an m-dimensional space.

In addition, the positions of the lattice points may be defined with respect to the linear combinations of the basis vectors using coefficients that have values within a particular value space. Put another way, the points of the lattice may be obtained by obtaining the set of linear combinations of the basis vectors with coefficients of the value space.

For instance, in mathematical terms, a lattice may be defined as follows: let $v_1, \ldots, v_n \in R^m$ be a set of linearly independent vectors that is the basis of a lattice "L", the lattice L generated by $v_1, \ldots, v_n$ is the set of linear combinations of $v_1, \ldots, v_n$ with coefficients $a_1, \ldots, a_n$ in the value space "Z," which is a subset of values within the m-dimensional space "R", is expressed as:

$$L = \{a_1 v_1 + a_2 v_2 + \ldots + a_n v_n : a_1, a_2, \ldots, a_n \in Z\}$$

A closest vector problem may be defined as finding a point in a lattice that is closest to a target location that is in the same m-dimensional space as the lattice. In mathematical terms, the closest vector problem may be defined as follows: given the lattice "L" defined by basis "A" that is a matrix that includes "n" number of m-dimensional vectors with a particular m-dimensional space and given a vector "y" that defines a particular location within the particular m-dimensional space, find a vector "x" that corresponds to a particular point in the lattice "L" such that the distance between "x" and "y" ($\|Ax-y\|_2$) is minimized, which may be expressed in expression (1) as follows:

$$\operatorname{argmin}_x \|Ax-y\|_2 = \operatorname{argmin}_x (x^T A^T A x - 2 y^T A x) \quad (1)$$

In the above-expression the use of "T" in the superscript refers to a transposition of the corresponding matrix.

In some embodiments, lattice problem inputs 104 ("lattice inputs 104") may include inputs that may be used to solve a closest vector problem of a lattice and/or a shortest vector problem of the lattice. For example, in some embodiments, the lattice inputs 104 may include the basis "A" that defines the lattice "L" in an m-dimensional space. In addition, the lattice inputs 104 may include the target vector "y" that defines the particular location in the m-dimensional space in which the solution to the closest vector problem is the vector "x" that corresponds to a point in the lattice "L" that is closest to the particular location defined by the target vector "y."

The input module 102 may be configured to perform one or more operations with respect to the lattice inputs 104 to generate Ising model inputs 110 ("model inputs 110"). The input module 102 may be configured to generate the model inputs 110 such that the model inputs 110 may be used by the Ising module 106 to solve for the closest vector problem.

For example, the Ising module 106 may be configured to perform a Markov Chain Monte Carlo (MCMC) stochastic search to minimize Ising energy by finding an output vector "x" in the following expression (2) of Ising energy that minimizes the Ising Energy:

$$E(x) = -\Sigma x^T W x - \Sigma b x \quad (2)$$

In the above expression, "W" is an Ising model connection weight matrix that weighs the connections between elements of the output vector "x" and "b" is a bias vector of linear terms used in minimizing the Ising Energy.

In some embodiments, the input module 102 may be configured to generate the Ising model connection weight matrix "W" and the bias vector "b" based on the lattice inputs 104. For instance, based on expressions (1) and (2) described above, in order to find a vector "x" of the lattice "L" that is defined by the basis "A" of the lattice inputs 104 in which the vector "x" corresponds to a point of the lattice "L" that is closest to the target vector "y" of the lattice inputs 104, "W" may be expressed with respect to the basis "A" by expression (3) as follows:

$$W = A^T A \quad (3)$$

As such, in some embodiments, the input module 102 may be configured to generate the weight matrix "W" by multiplying a transposition of the basis matrix "A" of the lattice inputs 104 ("$A^T$") by the basis matrix "A" according to expression (3).

In addition, based on expressions (1) and (2) described above, "b" may be expressed with respect to the basis "A" and the target vector "y" of the lattice inputs 104 by expression (4) as follows:

$$b = 2y^T A \quad (4)$$

As such, in some embodiments, the input module 102 may be configured to generate the bias vector "b" by multiplying a transposition of the target vector "y" of the lattice inputs 104 ("$Ay^T$") by the target vector "y" according to expression (4).

In some embodiments, the Ising module 106 may be configured to perform the operations based on a binary input. In these or other embodiments, the input module 102 may be configured to convert the generated weight matrix "W" and the generated bias vector "b" into a binary format.

Additionally or alternatively, the Ising module 106 may be configured to receive as an input a number of bits of the output "x" of the optimization problem. In these or other embodiments, the input module 102 may be configured to determine the number of bits to provide to the Ising module 106. For example, in some embodiments, the input module 102 may be configured to determine a boundary "r" for the magnitude of the output vector "x." The boundary "r" may represent an amount that may be greater than or equal to the magnitude of the output vector "x." As such, a number of bits that is sufficient to represent the boundary "r" is also sufficient to represent the output vector "x." Therefore, in some embodiments, the input module 102 may be configured to determine the number of bits "d" that are given as an input to the Ising module 106 by determining the number of bits of the boundary "r". In some embodiments, the input module 102 may be configured to determine the number of bits by taking the log (base 2) of the boundary "r" as provided by expression (5):

$$d = \log_2 r \quad (5)$$

In some embodiments, the boundary "r" may be determined based on the determinant of the lattice "L" that may be defined by the basis "A." The determinant may be an indication of the amount of space in the m-dimensional space that may be occupied by the lattice "L." For example, the determinant of a 3-dimensional lattice may be the volume of the 3-dimensional lattice. In these or other embodiments, the input module 102 may be configured to determine the determinant of the lattice "L" by determining the determinant of the basis "A."

In these or other embodiments, the input module 102 may be configured to use the determined determinant as the boundary "r". For example, the magnitude of the output vector "x" that may be generated by the Ising module 106 may be less than the determinant of the lattice "L" given that the output vector "x" is within the space occupied by the lattice "L." As such, a number of bits that is sufficient to represent the determinant is also sufficient to represent the output vector "x."

Additionally or alternatively, the input module 102 may be configured to determine the boundary "r" based on the type of lattice that the lattice "L" is defined as. For instance, for a q'-ary lattice, (like those used in lattice based cryptography) r may be set as "$(r')^2$".

In these or other embodiments, the input module 102 may be configured to perform the binary conversion of "W" and "b" up to the determined number of bits. Additionally or alternatively, the input module 102 may be configured to format the last row and the last column of "W" and the last row of "b" in a one's complement format to allow for the use of negative numbers. By way of example, the input module 102 may be configured to determine "W" as follows in expression (6) with respect to the basis "A", and the determined number of bits "d":

$$W = \begin{bmatrix} A^T \\ 2A^T \\ 4A^T \\ \vdots \\ 2^d A^T \\ -2d^{d+1} A^T \end{bmatrix} \cdot [A^T A^T A^T \ldots 2^d A^T \; -2^{d+1} A^T] \quad (6)$$

Expression (6) may be expanded out as follows in expression (7):

$$W = \begin{bmatrix} A^T A & 2A^T A & 4A^T A & \ldots & 2^d A^T A & -2^{d+1} A^T A \\ 2A^T A & 4A^T A & 8A^T A & \ldots & 2^{d+1} A^T A & -2^{d+2} A^T A \\ 4A^T A & 8A^T A & 16A^T A & \ldots & 2^{d+2} A^T A & -2^{d+3} A^T A \\ \vdots & \vdots & \vdots & \ddots & \vdots & \vdots \\ 2^d A^T A & 2^{d+1} A^T A & 2^{d+2} A^T A & \ldots & 2^{2d} A^T A & -2^{2d+1} A^T A \\ -2^{d+1} A^T A & -2^{d+2} A^T A & -2^{d+3} A^T A & \ldots & -2^{2d+1} A^T A & -2^{2d+2} A^T A \end{bmatrix} \quad (7)$$

In addition, the input module 102 may be configured to determine "b" as follows in expression (8) with respect to the basis "A", the target vector "y", and the determined number of bits "d":

$$b = \begin{bmatrix} 2y^T A \\ 4y^T A \\ 8y^T A \\ \vdots \\ 2^{d+1} y^T A \\ -2^{d+2} y^T A \end{bmatrix} \quad (8)$$

The input module 102 may be configured to include the determined weight matrix "W" (such as that illustrated in expression (7)) and the determined bias vector "b" (such as illustrated in expression (8)) in the model inputs 110. In these or other embodiments, the input module 102 may be configured to include the determined number of bits "d" in the model inputs 110. In these or other embodiments, the input module 102 may be configured to provide the model inputs 110 to the Ising module 106.

As described above, the Ising module 106 may be configured to solve optimization problems written according to the Ising optimization model described above. In addition, as also indicated above, the Ising module 106 may be part of the annealing system such that the annealing system is able to use the Ising optimization model to solve optimization problems in a much faster manner than classically configured computing systems. In these or other embodiments, the Ising module 106 may be configured to generate an Ising model output 108 ("model output 108") as a solution to the optimization problem.

In some embodiments, the Ising module 106 may include an information processing apparatus that may include one or more Ising units. The Ising units may be configured to perform an operation of an Ising type energy function of a neural network by small-scale hardware based on an algorithm such as the DeGloria algorithm. The elements in the matrix W may include weighting values between neurons of the neural network. For example, an element in the matrix W may include a weighting value between a first neuron represented by row number in the matrix W and a second neuron represented by a column number in the matrix W, where the row and column number identify the element. The information processing apparatus may work to minimize the energy in the neural network to determine a solution to a problem represented by the matrix W and vector b.

An example of an information processing apparatus that includes Ising units is provided in U.S. Publication No. 2018/0075342, filed on Aug. 30, 2017 and incorporated by reference in this disclosure in its entirety. As described in U.S. Publication No. 2018/0075342, the Ising units may include an energy value calculation circuit and a state transition determination circuit. The energy value calculation circuit may be configured to calculate an energy value, which is based on a value of one or more of the elements in the matrix "W", that may be used to generate the output of the information processing apparatus. The output may include a solution to the problem represented by the matrix W and vector b. Additional information and examples of the state transition determination circuit is provided in U.S. Publication No. 2018/0107172, filed on Sep. 28, 2017 and incorporated by reference in this disclosure in its entirety.

Based on the determined weight matrix "W" and the determined bias vector "b", which as described above are determined according to the basis "A" of the lattice "L", the target vector "y", and the closest vector problem, the Ising module 106 may be configured to determine the output vector "x" that corresponds to a point in the lattice "L" that is closest to the particular location defined by the target vector "y." As such, the annealing system may be used to solve the closest vector problem using the Ising module 106 and the model inputs 110 generated by the input module 102. In these or other embodiments, the output vector "x" may be included in the model output 108.

In some embodiments, the output module 112 may be configured to perform one or more operations on the output vector "x" to obtain the solution to the closest vector problem. For example, in some embodiments, the Ising module 106 may be configured to generate the model output 108 (e.g., the output vector "x") in a binary representation. In these or other embodiments, the output module 112 may be configured to convert the model output 108 from binary representation to a decimal representation that may be output as a lattice problem solution 114.

In some embodiments, the input module 102 and the output module 112 may be configured to perform operations to solve a shortest vector problem based on using the closest vector problem operations. For instance, the point in the lattice "L" that has the shortest vector is often used as a solution to the shortest vector problem.

In some embodiments, to solve the shortest vector problem, the lattice inputs 104 may include an initial basis "AI" that may be modified to generate a plurality of bases "$A_i$". In addition, in some instances that solve the shortest vector problem, the lattice inputs 104 may not include the target vector "y" specifically enumerated as such. Instead, the input module 102 may be configured to obtain, based on the initial basis "AI", a particular target vector "$y_i$" that corresponds to a respective basis "$A_i$".

In particular, to generate a basis "$A_i$", the input module 102 may be configured to double the elements of a specific vector "$v_i$" of the initial basis "AI" to obtain "$A_i$". In addition, the specific vector "$v_i$" may be used as the target vector "$y_i$".

For instance, a particular initial basis "AI" may include four 3-dimensional vectors in which the first vector ($v_1$) has elements {a, b, c} in a first column of "AI", the second vector ($v_2$) has elements {d,e,f} in a second column of "AI", the third vector ($v_3$) has elements {g,h,i} in a third column of "AI", and the fourth vector ($v_4$) has elements {j, k, l} in a fourth column of "AI." To obtain a basis "$A_1$", the input module 102 may change the elements of $v_1$ in the first column of "$A_1$" to {2a, 2b, 2c}, may keep elements {d,e,f} in the second column of "$A_1$", may keep elements {g,h,i} in the third column of "$A_1$", and may keep elements {j,k,l} in the fourth column of "$A_1$". Additionally, to obtain a target vector "$y_1$" that corresponds to the basis "$A_1$", the input module 102 may use the first vector $v_1$ ({a,b,c}) as the target vector "$y_1$".

In some embodiments, the input module 102 may be configured to obtain a basis "$A_i$" and corresponding target vector "$y_i$" for each vector of the basis "AI". For example, continuing with the example of the preceding paragraph, the input module 102 may also be configured to obtain a basis "$A_2$" for the particular initial basis "AI", in which the elements of $v_1$ in the first column of $A_2$ are {a, b, c}, the elements of $v_2$ in the second column of "$A_2$" are {2d, 2e, 2f}, the elements of $v_3$ in the third column of $A_2$ are {g, h, i}, and the elements of $v_4$ in the fourth column of "$A_2$" are {j,k,l}. Additionally, to obtain a target vector "$y_2$" that corresponds to the basis "$A_2$", the input module 102 may use the second vector $v_2$({d,e,f}) as the target vector "$y_2$". The input module 102 may be configured to obtain a basis "$A_3$" and a target vector "$y_3$" in a similar manner with respect to $v_3$ of the particular initial basis "AI" and may be configured to obtain a basis "$A_4$" and a target vector "$y_4$" in a similar manner with respect to $v_4$ of the particular initial basis "AI".

In some embodiments, the input module 102 may be configured to obtain a weight matrix "$W_i$" and a bias vector "$b_i$" based on a respective basis "$A_i$" and its respective target vector "$y_i$" in the manner described above regarding obtaining the weight matrix "W" and the bias vector "b" in the closest vector problem discussion. Additionally or alternatively, the input module 102 may be configured to obtain a weight matrix "$W_i$" and a bias vector "$b_i$" based on each respective basis "$A_i$" and its respective target vector "$y_i$".

For example, continuing with the example given above, the input module 102 may be configured to obtain each of the following: a weight matrix "$W_1$" and a bias vector "$b_1$" based on the basis "$A_1$" and the target vector "$y_1$"; a weight matrix "$W_2$" and a bias vector "$b_2$" based on the basis "$A_2$" and the target vector "$y_2$"; a weight matrix "$W_3$" and a bias vector "$b_3$" based on the basis "$A_3$" and the target vector "$y_3$"; and a weight matrix "$W_4$" and a bias vector "$b_4$" based on the basis "$A_4$" and the target vector "$y_4$".

In some embodiments, the obtained weight matrices "$W_i$" and bias vectors "$b_i$" may be included in the model inputs 110 that may be provided to the model module 106. The model module 106 may perform operations such as described above with respect to each weight matrix "$W_i$" and its corresponding bias vector "$b_i$" to obtain a corresponding output vector "$x_i$" that may be a solution to the closest vector problem with respect to the corresponding basis "$A_i$" and target vector "$y_i$". Additionally or alternatively, each of the corresponding output vectors "$x_i$" may be included in the model output 108.

For example, continuing with the example given above, the model module 106 may be configured to obtain each of the following: an output vector "$x_1$" that is based on the weight matrix "$W_1$" and the bias vector "$b_1$" and that represents the closest vector of the lattice defined by the basis "$A_1$" to the target vector "$y_1$"; an output vector "$x_2$" that is based on the weight matrix "$W_2$" and the bias vector "$b_2$" and that represents the closest vector of the lattice defined by the basis "$A_2$" to the target vector "$y_2$"; an output vector "$x_3$" that is based on the weight matrix "$W_3$" and the bias vector "$b_3$" and that represents the closest vector of the lattice defined by the basis "$A_3$" to the target vector "$y_3$"; and an output vector "$x_4$" that is based on the weight matrix "$W_4$" and the bias vector "$b_4$" and that represents the closest vector of the lattice defined by the basis "$A_4$" to the target vector "$y_4$". In these or other embodiments, the generated output vectors "$x_1$", "$x_2$", "$x_3$", and "$x_4$" may be included in the model output 110.

In some embodiments, the output module 112 may be configured to determine the solution to the shortest vector problem based on the generated output vectors "$x_i$" and the corresponding target vectors "$y_i$". For example, the output module 112 may be configured to determine a distance between each output vector "$x_i$" and its corresponding target vector "$y_i$" that is used to obtain the respective output vector "$x_i$". In these or other embodiments, the output module 112 may determine that the output vector "$x_i$" that corresponds to the shortest determined distance is the solution to the shortest vector problem. In these or other embodiments, the output module 112 may be configured to include the output vector "$x_i$" that corresponds to the shortest determined distance in the lattice problem solution 114 as the solution to the shortest vector problem with respect to the corresponding initial basis. Additionally or alternatively, the output module 112 may be configured to perform the binary conversion before or after performing the distance determinations.

For instance, continuing with the example given above, the output module 112 may be configured to obtain each of the following: a first distance between the output vector "$x_1$" and the target vector "$y_1$"; a second distance between the output vector "$x_2$" and the target vector "$y_2$"; a third distance between the output vector "$x_3$" and the target vector "$y_3$"; and a fourth distance between the output vector "$x_4$" and the target vector "$y_4$". Additionally, the first distance may be the shortest distance. The output module 112 may accordingly be configured to provide the output vector "$x_1$" as the solution to the shortest vector problem. In these or other embodiments, the output module 112 may include the output vector "$x_1$" in the lattice problem solution 114 as a solution to the shortest vector problem with respect to the particular initial basis "AI".

As indicated above, in some embodiments, the environment 100 may be configured to improve certain technological fields that utilize lattice problems. For example, learning with errors (LWE) based cryptography systems, the level of security of the systems may be determined by solving an LWE problem. Additionally or alternatively, and LWE problem may be formulated as a closest vector problem.

In some embodiments, the lattice inputs 104 may include LWE inputs of a particular LWE based cryptography system. The LWE inputs may include a matrix of samples from a bounded error distribution of the corresponding cryptography system and a vector "c" that includes the matrix of the bounded error distribution and a vector "e" of samples obtained from the bounded error distribution. In some embodiments, the input module 102 may be configured to formulate the LWE problem as a closest vector problem by obtaining the basis "A" and the target vector "y" from the matrix of samples and the vector "c" using any suitable technique as the LWE may be viewed as a specially structured closest vector problem as known in the field of cryptography. After obtaining the basis "A" and the target vector "y", the input module 102 may be configured to generate a corresponding "W" and "b" as described above to obtain the solution to the particular closest vector problem such as described above. The solving of this particular closest vector problem may be used provide an indication as to the security of the particular LWE based cryptography system, which may thus be used to potentially make changes to the particular LWE based cryptography system. More information regarding the use of closest vector problems with respect to LWE based cryptography systems may be found in the paper entitled "On Lattices, Learning with Errors, Random Linear Codes, and Cryptography" by Oded Regev, which is dated May 2, 2009 and is incorporated in this disclosure by reference in its entirety.

For example, the ability to solve the particular closest vector problem may result in the ability to break the encryption performed by LWE based cryptography systems. Additionally, the speed at which the particular closest vector problem may be solved also indicates the speed at which the corresponding LWE based cryptography system may be cracked. Therefore, the solving of the particular closest vector problem and speed at which the particular closest vector problem may be solved using annealing systems may be used to identify what changes may be made to the LWE based cryptography system to increase the difficulty of solving related closest vector problems.

Further, as another example, the environment 100 may be configured to improve wireless communications that utilize lattice problems. For example, a compute and forward relaying technique is increasingly used in wireless communications where a relay receives wireless communications from multiple wireless transmitters. The relay may decode a linear combination of transmitted messages and may use the linear combination to reconstruct individual messages. The use of compute and forward techniques may allow for messages to be transmitted using the same physical layer resources. In some instances, the solution to a shortest vector problem may be used to as a coefficient vector used to perform the decoding. The coefficient vector determined based on the solution to the shortest vector problem may improve or maximize a computation rate that may be performed at the relay.

As such, in some embodiments, the lattice inputs 104 may include a particular matrix that is defined for the compute and forward relay. In these or other embodiments, the input module 102 may use the particular matrix as the initial basis "AI", which may be used by the environment 100 to solve a particular shortest vector problem with respect to the particular matrix such as described above. The solution to the particular shortest vector problem may be used as the coefficient vector.

Modifications, additions, or omissions may be made to FIG. 1 without departing from the scope of the present disclosure. For example, the environment 100 may include more or fewer elements than those illustrated and described in the present disclosure.

Figure 2:
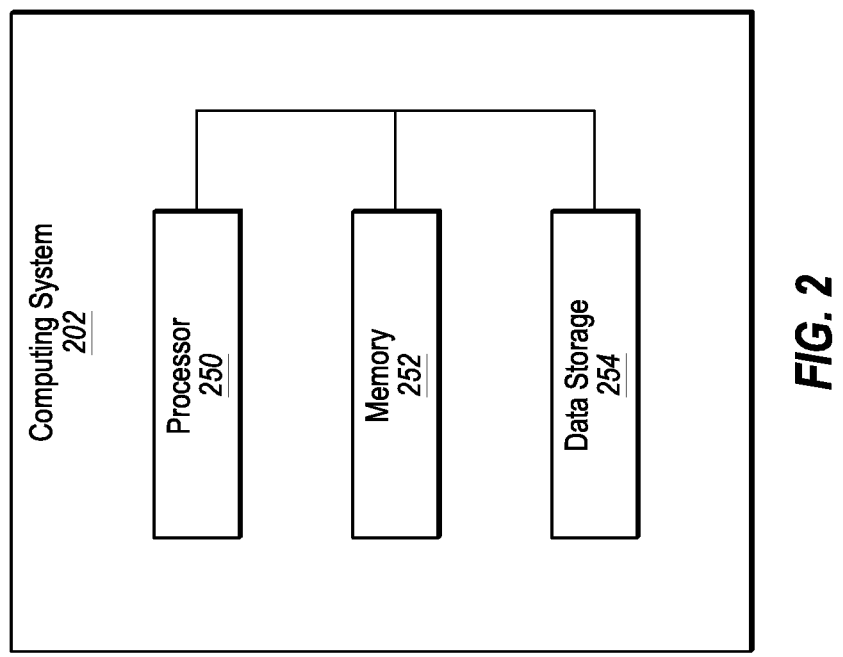
FIG. 2 illustrates an example computing system that may be configured to solve lattice problems.

FIG. 2 illustrates a block diagram of an example computing system 202 configured to solve lattice related problems, according to at least one embodiment of the present disclosure. The computing system 202 may be configured to implement or direct one or more operations associated with an Ising model input module (e.g., the input module 102 of FIG. 1), an Ising model module (e.g., the model module 106 of FIG. 1), and/or an Ising model output module (e.g., the output module 112 of FIG. 1). In some embodiments, the computing system 202 may be included in or form part of an annealing system. The computing system 202 may include a processor 250, a memory 252, and a data storage 254. The processor 250, the memory 252, and the data storage 254 may be communicatively coupled.

In general, the processor 250 may include any suitable special-purpose or general-purpose computer, computing entity, or processing device including various computer hardware or software modules and may be configured to execute instructions stored on any applicable computer-readable storage media. For example, the processor 250 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 250 may include any number of processors configured to, individually or collectively, perform or direct performance of any number of operations described in the present disclosure. Additionally, one or more of the processors may be present on one or more different electronic devices, such as different servers.

In some embodiments, the processor 250 may be configured to interpret and/or execute program instructions and/or process data stored in the memory 252, the data storage 254, or the memory 252 and the data storage 254. In some embodiments, the processor 250 may fetch program instructions from the data storage 254 and load the program instructions in the memory 252. After the program instructions are loaded into memory 252, the processor 250 may execute the program instructions.

The memory 252 and the data storage 254 may include computer-readable storage media for carrying or having computer-executable instructions or data structures stored thereon. Such computer-readable storage media may include any available non-transitory media that may be accessed by a general-purpose or special-purpose computer, such as the processor 250. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other non-transitory storage medium which may be used to carry or store particular program code in the form of computer-executable instructions or data structures and which may be accessed by a general-purpose or special-purpose computer. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

Combinations of the above may also be included within the scope of computer-readable storage media. Computer-executable instructions may include, for example, instructions and data configured to cause the processor 250 to perform a certain operation or group of operations.

Modifications, additions, or omissions may be made to the computing system 202 without departing from the scope of the present disclosure. For example, in some embodiments, the computing system 202 may include any number of other components that may not be explicitly illustrated or described.

Figure 3:
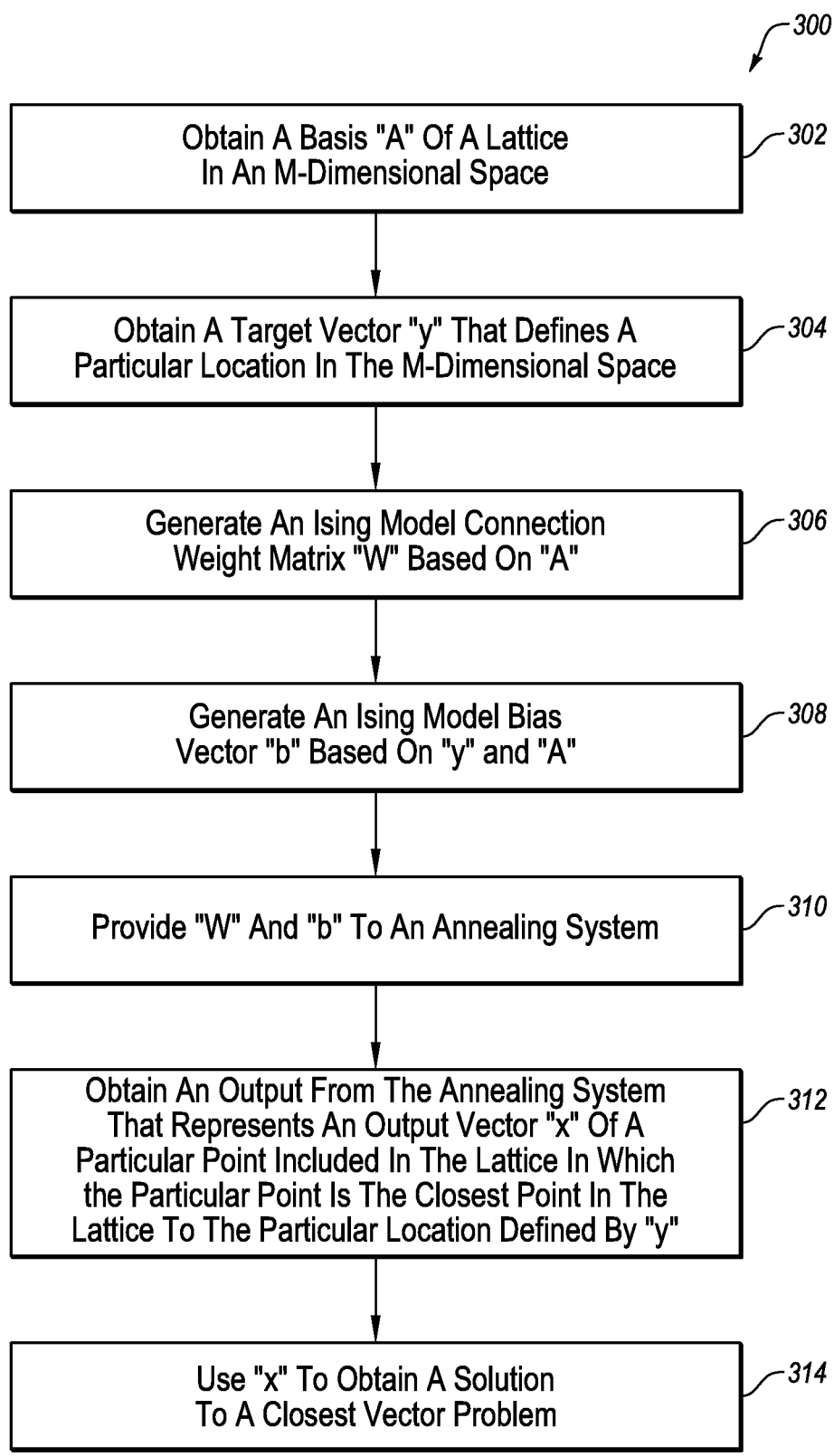

FIG. 3 is a flowchart of an example method 300 of solving a closest vector lattice problem, according to at least one embodiment described in the present disclosure. The method 300 may be performed by any suitable system, apparatus, or device. For example, one or more operations of the method 300 may be performed by one or more elements of the environment 100 of FIG. 1 or by one or more of the computing systems 202 of FIG. 2. Although illustrated with discrete blocks, the steps and operations associated with one or more of the blocks of the method 300 may be divided into additional blocks, combined into fewer blocks, or eliminated, depending on the particular implementation.

The method 300 may begin at block 302, at which a basis "A" that defines a lattice in an m-dimensional space may be obtained. The lattice may include multiple points in the m-dimensional space. Additionally, the basis "A" may be a matrix of "n" number of linearly independent vectors in which each respective vector has "m" elements that define a location in the m-dimensional space and in which each respective point of the lattice is defined with respect to a linear combination of the vectors of the basis. At block 304, a target vector "y" that defines a particular location in the m-dimensional space may be obtained.

In some embodiments, the basis "A" and the target vector "y" may be obtained based off of LWE inputs of a LWE problem that correspond to determining security of a LWE based cryptography system, such as described above with respect to FIG. 1. Additionally or alternatively, the basis "A" and the target vector "y" may be obtained based on an initial basis "AI" that may be provided with respect to solving a shortest vector problem that corresponds to the initial basis "AI" such as described above and described below with respect to a method 400 of FIG. 4. In these or other embodiments, the initial basis "AI" may be obtained with respect to a compute and forward relaying scheme such as described above.

At block 306, an Ising model connection weight matrix "W" may be generated based on the basis "A". For example, the Ising model connection weight matrix "W" may be generated by multiplying a transposition of "A" ("$A_T$") by "A", such as described above.

At block 308, an Ising model bias vector "b" may be generated based on the basis "A" and the target vector "y". For example, the Ising model bias vector "b" may be generated by multiplying a transposition of "y" ("$y_T$") by "A", such as described above.

In some embodiments, the elements of "W" and "b" may be converted into a binary format to allow for input of "W" and "b" to an Ising model, such as described above. In these or other embodiments, the number of bits for the elements of "W" and "b" may be determined based on a boundary "r", such as detailed above. For instance, in some embodiments, the boundary "r" may be determined based on a determinant of the lattice defined by "A". In these or other embodiments, the determinant may be determined by determining a determinant of "A".

At block 310, "W" and "b" may be provided to an annealing system configured to solve problems written according to the Ising model. Based on the determined weight matrix "W" and the determined bias vector "b", which as described above are determined according to the basis "A" of the lattice, the target vector "y", and the closest vector problem, the annealing system may be configured to determine an output vector "x" that corresponds to a point in the lattice that is closest to the particular location defined by the target vector "y."

At block 312, an output that represents the output vector "x" may be obtained from the annealing system. At block 314, the output vector "x" may be used to obtain a solution to the closest vector problem. For example, in some embodiments, the output vector "x" may be converted from a binary representation as output by the annealing system to a decimal representation that may be used as the solution to the closest vector problem.

Modifications, additions, or omissions may be made to the method 300 without departing from the scope of the present disclosure. For example, the operations of method 300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments. For example, in some embodiments, the method 300 may include one or more operations related to converting the output vector "x" from a binary format to another format (e.g., a decimal format).

Figure 4:
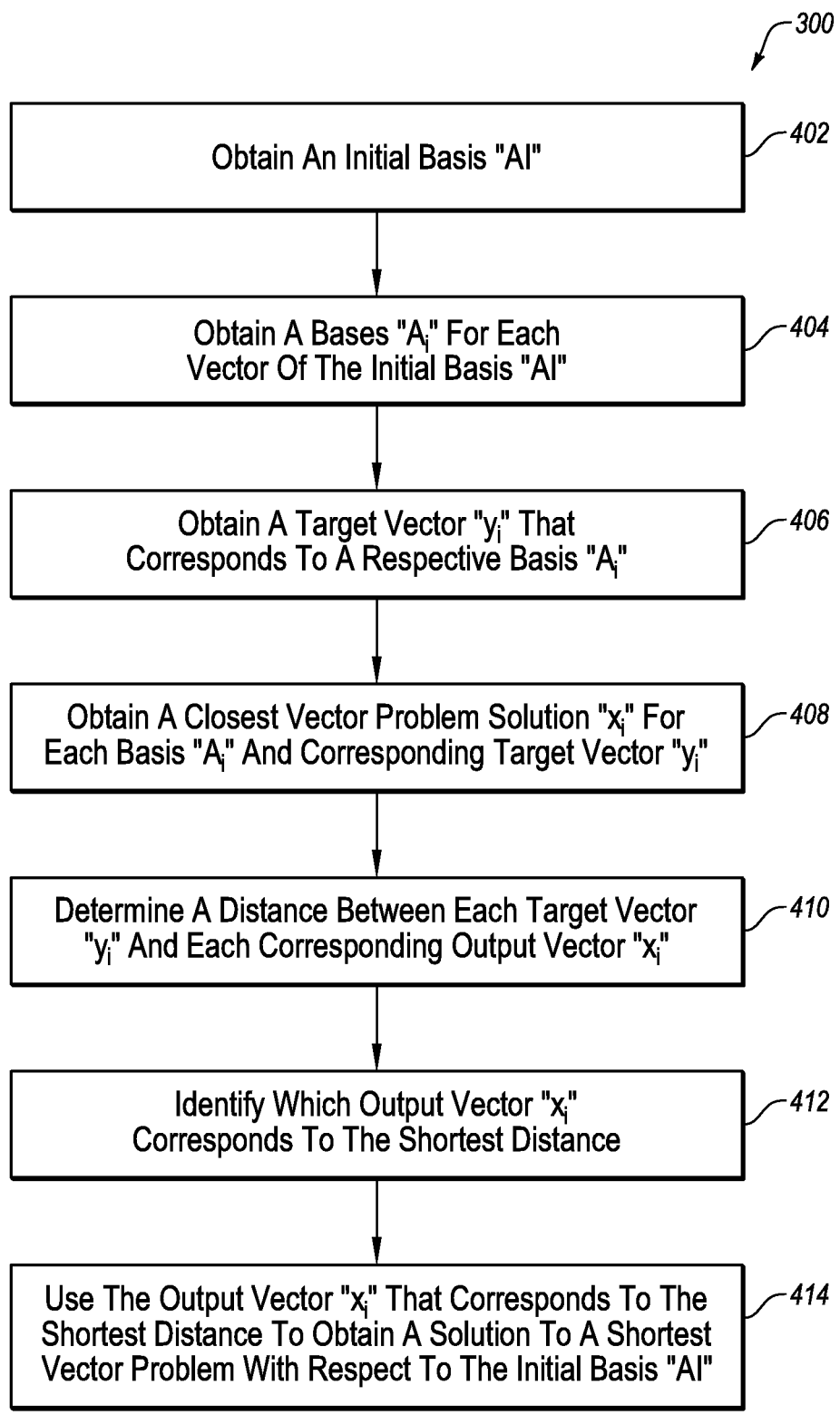

FIG. 4 is a flowchart of an example method 400 of solving a shortest vector lattice problem, according to at least one embodiment described in the present disclosure. The method 400 may be performed by any suitable system, apparatus, or device. For example, one or more operations of the method 400 may be performed by one or more elements of the environment 100 of FIG. 1 or by one or more of the computing systems 202 of FIG. 2. Although illustrated with discrete blocks, the steps and operations associated with one or more of the blocks of the method 400 may be divided into additional blocks, combined into fewer blocks, or eliminated, depending on the particular implementation.

The method 400 may begin at block 402, at which an initial basis "AI" that defines a lattice in an m-dimensional space may be obtained. The lattice may include multiple points in the m-dimensional space. Additionally, the initial basis "AI" may be a matrix of "n" number of linearly independent vectors in which each respective vector has "m" elements that define a location in the m-dimensional space and in which each respective point of the lattice is defined with respect to a linear combination of the vectors of the basis. In some embodiments, the initial basis "AI" may correspond to a shortest vector problem associated with compute and forward relaying such as described above.

At block 404, a basis "$A_i$" may be obtained from the initial basis "AI" in which "$AA_i$" is the same as "AI" except with the elements of a specific vector "i" of "AI" being doubled in "$A_i$". In some embodiments, a basis "$A_i$" may be obtained for every vector of "AI". Each basis "$A_i$" may be obtained as described above in the shortest vector problem description of FIG. 1 in some embodiments.

At block 406, a target vector "$y_i$" that corresponds to a respective basis "$A_i$" may be obtained. In these or other embodiments, multiple target vectors "$y_i$" may be obtained in which each target vector "$y_i$" corresponds to a respective basis "$A_i$". In some embodiments, the target vectors "$y_i$" may be obtained by using the corresponding specific vector "i" as the respective target vector "$y_i$", as described above in the shortest vector problem description of FIG. 1 in some embodiments.

At block 408, a closest vector problem solution output vector "$x_i$" may be obtained for each basis "$A_i$" and corresponding target vector "$y_i$". For example, in some embodiments, each basis "$A_i$" and corresponding target vector "$y_i$" may be obtained at blocks 302 and 304 of the method 300 and then operations of blocks 306, 308, 310, 312, and 314 may be performed accordingly to obtain each output vector "$x_i$".

At block 410, a distance between each target vector "$y_i$" and its corresponding output vector "$x_i$" may be determined. At block 412, based on the determinations from block 412, it may be determined as to which output vector "$x_i$" corresponds to the shortest determined distance. At block 414, the output vector "$x_i$" that corresponds to the shortest distance may be used to obtain a solution to the shortest vector problem with respect to the initial basis "AI". For example, in some embodiments, the output vector "$x_i$" may be converted from a binary representation as output by the annealing system to a decimal representation that may be used as the solution to the shortest vector problem. In these or other embodiments, in instances in which the initial basis "AI" is based on a compute and forward relaying scheme, the output vector "$x_i$" that corresponds to the shortest distance may be used as a coefficient vector that may maximize computation speeds of the corresponding relay.

Modifications, additions, or omissions may be made to the method 400 without departing from the scope of the present disclosure. For example, the operations of method 400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

As indicated above, the embodiments described in the present disclosure may include the use of a special purpose or general purpose computer (e.g., the processor 250 of FIG. 2) including various computer hardware or software modules, as discussed in greater detail below. Further, as indicated above, embodiments described in the present disclosure may be implemented using computer-readable media (e.g., the memory 252 or data storage 254 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method at least to improve one or more technical fields including one or more of: cryptography, cryptanalysis, or wireless communications, the method comprising:

obtaining a basis "A" that defines a lattice in an m-dimensional space, the lattice including a plurality of points in the m-dimensional space, the basis "A" being a matrix of "n" number of linearly independent vectors in which each respective vector has "m" elements that define a location in the m-dimensional space and in which each respective point of the lattice is defined with respect to a linear combination of the vectors of the basis;

obtaining a target vector "y" that defines a particular location in the m-dimensional space;

manipulating the basis "A" and the target vector "y" to obtain inputs that enable an annealing system to solve problems related to the lattice, the manipulating including:

generating an Ising model connection weight matrix "W" by multiplying a transposition of "A" ("$A^T$") by "A";

generating an Ising model bias vector "b" by multiplying a transposition of "y" ("$y^T$") by "A"; and converting values of "W" and "b" into binary format to allow for input of "W" and "b" to the annealing system;

providing "W" and "b" to the annealing system;

obtaining an output from the annealing system that represents an output vector "x" of a particular point included in the lattice in which the particular point is the closest point in the lattice to the particular location defined by "y"; and using "x" to obtain a solution to a closest vector problem related to the lattice, the closest vector problem being defined by finding which point in the lattice is closest to the particular location as defined by "y".

2. The method of claim 1, further comprising:

obtaining "A" from an initial basis "AI" in which "AI" defines another lattice in the m-dimensional space in which "A" is the same as "AI" except with the elements of a specific vector "i" of "AI" being doubled in "A";

obtaining the target vector "y" from "AI" by using the specific vector "i" as the target vector "y";

determining a distance between the target vector "y" and the output vector "x"; and using the distance between the target vector "y" and the output vector "x" in determining a solution to a shortest vector problem that is defined by finding which point in the other lattice has the shortest vector.

3. The method of claim 2, further comprising:

repeating the operations of claim 2 for every vector of the initial basis "AI" to obtain a plurality of distances between each target vector "y" and its corresponding output vector "x"; and using a particular output vector "x" that corresponds to the shortest distance of the plurality of distances as the solution to the shortest vector problem.

4. The method of claim 2, further comprising solving a compute and forward problem using the solution to the shortest vector problem.

5. The method of claim 1, further comprising determining a number of bits for "W" and "b" based on a determinant of the lattice.

6. The method of claim 5, further comprising determining the determinant by determining the determinant of "A".

7. The method of claim 1, further comprising testing whether a particular learning with error based cryptography system is secure using "x".

8. One or more non-transitory computer-readable storage media configured to store instructions that, in response to being executed, cause a system to perform operations at least to improve one or more technical fields including one or more of: cryptography, cryptanalysis, or wireless communications, the operations comprising:
 obtaining a basis "A" that defines a lattice in an m-dimensional space, the lattice including a plurality of points in the m-dimensional space, the basis "A" being a matrix of "n" number of linearly independent vectors in which each respective vector has "m" elements that define a location in the m-dimensional space and in which each respective point of the lattice is defined with respect to a linear combination of the vectors of the basis;
 obtaining a target vector "y" that defines a particular location in the m-dimensional space;
 manipulating the basis "A" and the target vector "y" to obtain inputs that enable an annealing system to solve problems related to the lattice, the manipulating including:
  generating an Ising model connection weight matrix "W" by multiplying a transposition of "A" ("$A^T$") by "A";
  generating an Ising model bias vector "b" by multiplying a transposition of "y" ("$y^T$") by "A"; and
  converting values of "W" and "b" into binary format to allow for input of "W" and "b" to the annealing system;
 providing "W" and "b" to the annealing system;
 obtaining an output from the annealing system that represents an output vector "x" of a particular point included in the lattice in which the particular point is the closest point in the lattice to the particular location defined by "y"; and
 using "x" to obtain a solution to a closest vector problem related to the lattice, the closest vector problem being defined by finding which point in the lattice is closest to the particular location as defined by "y".

9. The one or more non-transitory computer-readable storage media of claim 8, wherein the operations further comprise:
 obtaining "A" from an initial basis "AI" in which "AI" defines another lattice in the m-dimensional space in which "A" is the same as "AI" except with the elements of a specific vector "i" of "AI" being doubled in "A";
 obtaining the target vector "y" from "AI" by using the specific vector "i" as the target vector "y";
 determining a distance between the target vector "y" and the output vector "x"; and
 using the distance between the target vector "y" and the output vector "x" in determining a solution to a shortest vector problem that is defined by finding which point in the other lattice has the shortest vector.

10. The one or more non-transitory computer-readable storage media of claim 9, wherein the operations further comprise:
 repeating the operations of claim 9 for every vector of the initial basis "AI" to obtain a plurality of distances between each target vector "y" and its corresponding output vector "x"; and
 using a particular output vector "x" that corresponds to the shortest distance of the plurality of distances as the solution to the shortest vector problem.

11. The one or more non-transitory computer-readable storage media of claim 9, wherein the operations further comprise solving a compute and forward problem using the solution to the shortest vector problem.

12. The one or more non-transitory computer-readable storage media of claim 8, wherein the operations further comprise determining a number of bits for "W" and "b" based on a determinant of the lattice.

13. The one or more non-transitory computer-readable storage media of claim 8, wherein the operations further comprise testing whether a particular learning with error based cryptography system is secure using "x".

14. A system at least to improve one or more technical fields including one or more of: cryptography, cryptanalysis, or wireless communications, the system comprising:
 one or more non-transitory computer-readable storage media configured to store instructions; and
 one or more hardware processors communicatively coupled to the one or more non-transitory computer-readable storage media and configured to, in response to execution of the instructions, cause the system to perform operations, the operations comprising:
  obtaining a basis "A" that defines a lattice in an m-dimensional space, the lattice including a plurality of points in the m-dimensional space, the basis "A" being a matrix of "n" number of linearly independent vectors in which each respective vector has "m" elements that define a location in the m-dimensional space and in which each respective point of the lattice is defined with respect to a linear combination of the vectors of the basis;
  obtaining a target vector "y" that defines a particular location in the m-dimensional space;
  manipulating the basis "A" and the target vector "y" to obtain inputs that enable an annealing system to solve problems related to the lattice, the manipulating including:
   generating an Ising model connection weight matrix "W" by multiplying a transposition of "A" ("AT") by "A";
   generating an Ising model bias vector "b" by multiplying a transposition of "y" ("yT") by "A"; and
   converting values of "W" and "b" into binary format to allow for input of "W" and "b" to the annealing system;
  providing "W" and "b" to the annealing system;
  obtaining an output from the annealing system that represents an output vector "x" of a particular point included in the lattice in which the particular point is the closest point in the lattice to the particular location defined by "y"; and
  using "x" to obtain a solution to a closest vector problem related to the lattice, the closest vector problem being defined by finding which point in the lattice is closest to the particular location as defined by "y".

15. The system of claim 14, wherein the operations further comprise:
 obtaining "A" from an initial basis "AI" in which "AI" defines another lattice in the m-dimensional space in which "A" is the same as "AI" except with the elements of a specific vector "i" of "AI" being doubled in "A";
 obtaining the target vector "y" from "AI" by using the specific vector "i" as the target vector "y";
 determining a distance between the target vector "y" and the output vector "x"; and
 using the distance between the target vector "y" and the output vector "x" in determining a solution to a shortest vector problem that is defined by finding which point in the other lattice has the shortest vector.

16. The system of claim 15, wherein the operations further comprise:
repeating the operations of claim 15 for every vector of the initial basis "AI" to obtain a plurality of distances between each target vector "y" and its corresponding output vector "x"; and
using a particular output vector "x" that corresponds to the shortest distance of the plurality of distances as the solution to the shortest vector problem.

17. The system of claim 15, wherein the operations further comprise solving a compute and forward problem using the solution to the shortest vector problem.

18. The system of claim 14, wherein the operations further comprise converting values of "W" and "b" into binary format to allow for input of "W" and "b" to the annealing system.

* * * * *